United States Patent Office 3,793,394
Patented Feb. 19, 1974

3,793,394
PURIFICATION OF HF CATALYST IN ALKYLATION PROCESS
Charles C. Chapman, Bartlesville, Okla., assignor to Phillips Petroleum Company
Filed May 8, 1972, Ser. No. 251,171
Int. Cl. C07c *3/54*
U.S. Cl. 260—683.48                         4 Claims

ABSTRACT OF THE DISCLOSURE

Olefins and isoparaffins are alkylated in the presence of an HF catalyst. Reactor effluent is passed to a settling zone. The hydrocarbon phase is fractionated to recover an alkylate product. The acid phase is recycled to the reactor. A portion of the recycled acid is passed to a purification column for removal of acid soluble oil. Stripping vapor and reflux liquid are passed to the purification column to remove substantially all of the HF from the acid soluble oil. A substantial portion of the acid soluble oil removed from the purification column is contacted externally with stripping vapor and reintroduced into the purification column.

---

It is common practice in the petroleum industry to produce high octane motor fuel by alkylating olefins with isoparaffins in the presence of a hydrogen fluoride (HF) catalyst. The effluent from the alkylation reactor is usually passed to a settling vessel wherein a hydrocarbon phase is separated from an acid phase. The hydrocarbon phase is fractionated to separate low boiling hydrocarbons from the alkylate product. The acid phase is recycled to the reactor. However, it is necessary to purify a portion of the recycled acid in order to prevent a buildup of acid soluble oil (ASO) in the system. This purification is usually accomplished by passing an HF-containing stream from the settler to a purification column wherein HF is stripped from the ASO by means of a vaporous hydrocarbon such as isobutane. While the HF purification systems employed heretofore have generally been effective to produce an acid stream having the required purity, the ASO stream from the purification unit often has contained undesirable amounts of HF. This has required subsequent purification steps to remove the HF before the ASO is recycled to the refinery or passed to a disposal unit.

In accordance with this invention, a method is provided for operating an HF purification unit so as to produce an HF stream of high purity with respect to ASO and to produce an ASO stream of low HF content. This is accomplished by passing ASO from the lower region of the purification unit through an external mixing zone and then back to the purification unit. A portion of the stripping vapor is introduced into the mixing zone to contact the ASO. The mixing zone advantageously is in the form of an eductor to provide intimate contacting of the ASO with the stripping vapor. In one specific embodiment of this invention, novel contacting apparatus is provided for use in the purification column.

Figure 1:
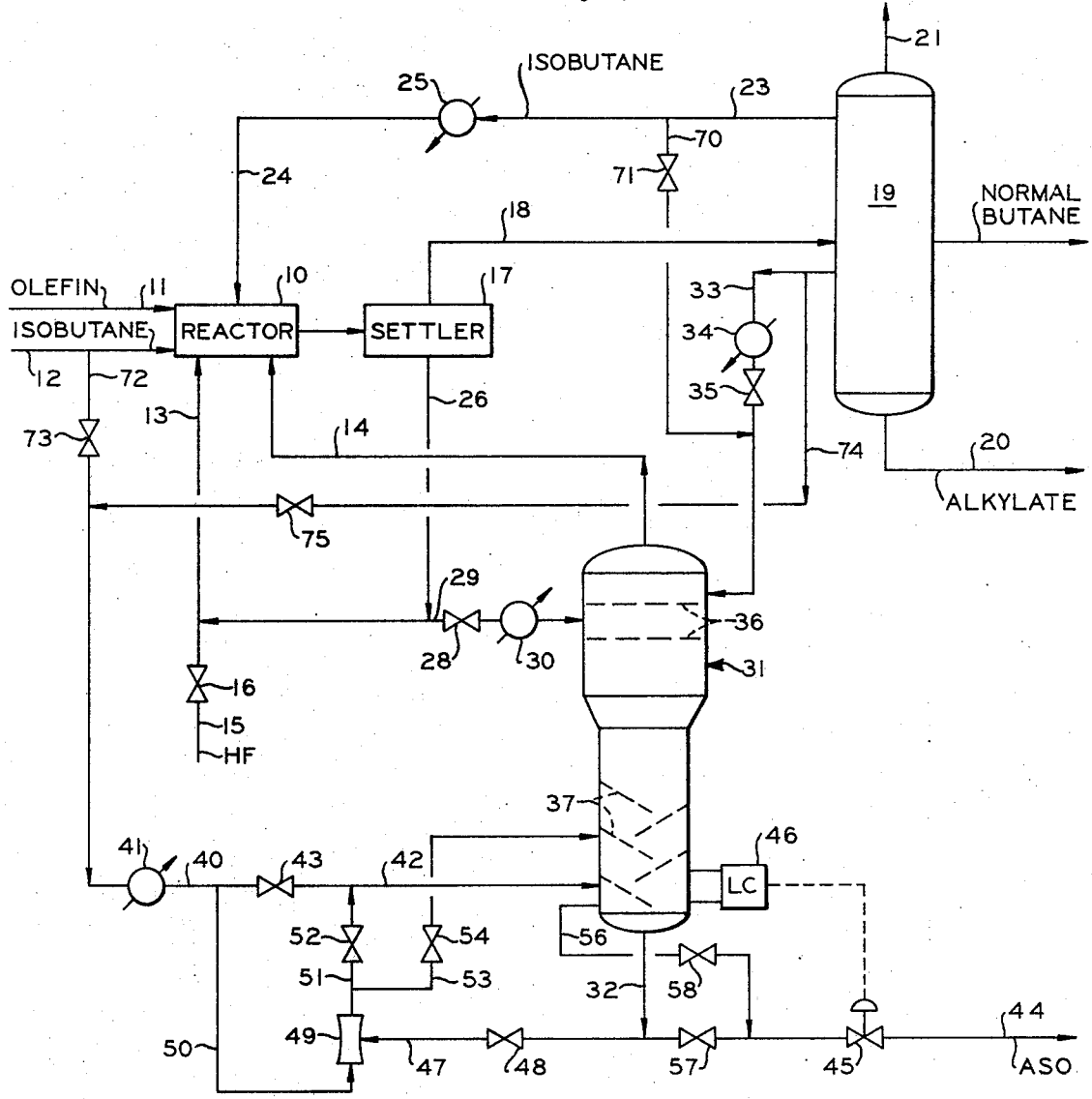
Figure 2:
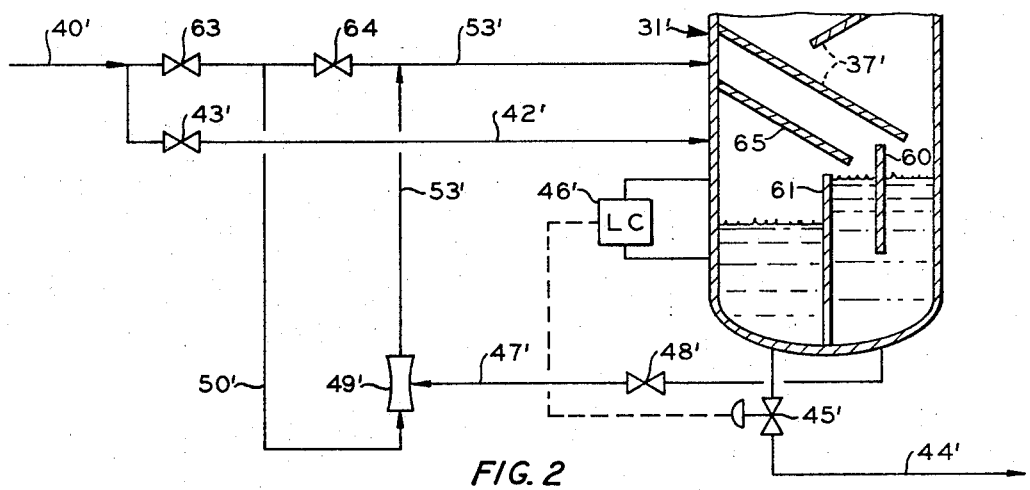

In the accompanying drawing, FIG. 1 is a schematic representation of an HF alkylation process employing an HF purification unit operated in accordance with this invention. FIG. 2 is a schematic illustration of a second embodiment of a portion of the HF purification unit.

Referring now to the drawing in detail, there is shown an alkylation reactor 10. An olefin feed stream is introduced through a conduit 11 and an isoparaffin feed stream if introduced through a conduit 12. The olefin feed generally comprises one or more olefins having from 2 to 5 carbon atoms, while the isoparaffin stream generally comprises isobutane and/or isopentane. In a typical operation, the olefin feed comprises a mixture of propylene and butylenes, while the isoparaffin feed comprises primarily isobutane. A catalyst comprising hydrogen fluoride is introduced into reactor 10 through a conduit 13 and through a recycle conduit 14. In a typical operation, the HF is in the liquid phase and has a purity of about 90%. Fresh makeup catalyst can be introduced as required through a conduit 15 which has a valve 16 therein. The effluent from reactor 10 is passed to a settler 17 in which a phase separation is made between the acid and hydrocarbons. The hydrocarbon phase is removed through a conduit 18 and passed to a fractionator 19. The fractionator is operated to produce a bottoms alkylate product stream which is removed through a conduit 20, an overhead propane stream which is removed through a conduit 21, a normal butane stream which is removed through a side conduit 22, an isobutane liquid stream which is removed through a side conduit 23, and an isobutane vapor stream which is removed through a side conduit 33. A portion of the isobutane removed through conduit 23 is recycled to reactor 10 through a conduit 24, the latter having a cooler 25 therein.

The acid phase is removed from settler 17 through a conduit 26. A portion of this stream is recycled directly to reactor 10 through a conduit 27. The remainder of the HF is passed through a conduit 29, which has a valve 28 and a heater 30 therein, to an acid purification column 31. A purified HF stream is removed from the top of column 31 through conduit 14 and recycled to reactor 10. ASO streams can be removed from the bottom of column 31 through conduits 32 and 56.

A hydrocarbon reflux liquid is introduced into the upper region of column 31 through conduit 33 which has a condenser 34 and a valve 35 therein. Reflux liquid can also be obtained from a conduit 70, which has a valve 71 therein. Conduit 70 extends between conduits 23 and 33. In the illustrated embodiment, conduit 29 communicates with column 31 between a pair of spaced contacting trays 36. The reflux is introduced above the uppermost tray 36. However, other types of vapor-liquid contacting elements can be employed in the upper region of column 31. The lower region of column 31 is provided with a plurality of vapor-liquid contacting means, such as inclined trays 37 which can be of the type shown in U.S. Pat. 3,410,759, for example. Isobutane stripping vapor is directed to the lower region of column 31 by a conduit 40. Conduit 40 receives vapor from conduit 12 through a conduit 72, which has a valve 73 therein, and/or through a conduit 74, which has a valve 75 therein. Conduit 74 communicates with conduit 33. A heater 41 is positioned in conduit 40 so that the stripping vapor can be introduced at a desired elevated temperature. A conduit 42, which has a valve 43 therein, extends between conduit 40 and the lower region of column 31.

The ASO removed through conduit 56 is withdrawn from the system through a conduit 44 which has a control valve 45 therein. Valve 45 is operated by a level controller 46 which is connected to the lower region of column 31 to sense the liquid level therein. The ASO removed through conduit 32 is passed through a conduit 47, which has a valve 48 therein, to an eductor 49. A conduit 50 extends between conduit 40 and the inlet of eductor 49. The outlet of eductor 49 is connected by a conduit 51, which has a valve 52 therein, to conduit 42 and by a conduit 53, which has a valve 54 therein, to column 31 at a location above the entry point of conduit 42. The flow of isobutane through eductor 49 serves to force ASO through the eductor and back to column 31 through conduit 51 and/or conduit 53. This provides intimate mixing of the stripping vapor and the ASO which greatly facilitates removal of entrained HF from the ASO. The vaporous isobutane passes upwardly through contacting means 37 to provide additional stripping of HF from the descending ASO. It is generally desirable to pass from 30 to 70 percent of the isobutane vapor flowing through conduit 40 through eductor 49. A valve 57 is disopsed in conduit 14 upstream of valve 45. valve 57 is disposed in conduit 44 upstream of valve 45. normally is open. Conduit 56 can communicate with column 31 at a location spaced upwardly from the lowermost point. This tends to avoid the withdrawal of HF which may tend to settle in the bottom of the column.

In a batch operation, using stripping vapor and reflux, valves 58 and 57 are closed and the ASO treated. Then, valve 48 is closed and valve 58 opened to dump ASO.

In a typical example of the operation of this invention, column 31 is employed to purify an acid stream obtained from the settler of an HF alkylation reaction in which a mixture of propylene and butylenes is alkylated with isobutane. The upper section of column 31 is approximately eight feet high and has a diameter of about five feet. Two trays 36 separated by a height of four feet are disposed in this section. The lower section of column 31 is approximately twelve feet high and has a diameter of about two feet. Several trays 43 (up to about 12) are disposed in this section about eighteen inches apart. Acid from settler 17 is introduced between trays 36 at a rate of about 240 barrels per day and at a temperature of about 285° F. Vaporous isobutane at a temperature of about 330° F. is introduced through conduit 42 at a rate of about 204 barrels per day and through conduit 50 at a rate of about 204 barrels per day (based on liquid volume). Liquid isobutane at a temperature of about 70° F. is introduced through conduit 33 at a rate of about 72 barrels per day. ASO at a temperature of about 318° F. is removed through conduit 32 at a rate of about 300 barrels per day and through conduit 56 at a rate of about 13.6 barrels per day. The ASO removed through conduit 56 contains about 8 pounds HF and has a water content of about 0.4 weight percent. A stream of regenerated HF and isobutane is removed through conduit 14 at a temperature of about 233° F. Column 31 is maintained at a pressure of about 100 p.s.i.g.

In a typical operation conducted prior to this invention without the recycle and mixing of ASO with stripping vapor, the same quantity of used acid is treated in column 31. However, the feed, overhead and bottom temperatures are 265° F., 215° F. and 260° F., respectively. The flows of stripping and reflux isobutane are each 96 barrels per day. Other conditions are the same as described above. In this operation, ASO is removed through conduit 32 at a rate of about 29 barrels per day. This ASO contains about 1910 pounds of HF and about 5 weight percent water. Thus, operating in accordance with this invention is capable of reducing the HF present in the ASO stream from about 1910 pounds per day to about 8 pounds per day in a typical operation. This greatly simplifies the disposal problem of the ASO, and allows recovery of a substantial quantity of HF catalyst.

A second embodiment of this invention is illustrated in FIG. 2. A first vertical baffle plate 60 is positioned in the lower region of column 31' so that liquid flowing downwardly across the lowermost plate 37' enters the region between plate 60 and the wall of the vessel. A second vertical baffle plate 61 is spaced from plate 60. Plate 61 engages the bottom of column 31', while the bottom edge of plate 60 is spaced upwardly from the bottom of column 31'. Plate 61 thus forms a dam over which the liquid flows before being removed through conduit 44'. Conduit 47' communicates with column 31' on the side of plate 61 opposite the side of withdrawal through conduit 44'. Valves 63 and 64 are disposed in conduit 40' to permit the flow of stripping vapor through eductor 49' to be adjusted. A sloping tray 65 is disposed in column 31' below the entry point of conduit 53' to direct the recycled liquid passed through eductor 49' back into the lower region of column 31'.

The apparatus illustrated in the drawing has been shown schematically in order to simplify the description. Conventional pumps, flow controllers, and the like which are necessary to provide and regulate the described flows have been omitted for the same reason. While the invention has been described in conjunction with presently preferred embodiments, it obviously is not limited thereto.

What is claimed is:

1. In an olefin and isoparaffin alkylation process employing an HF catalyst, in which effluent from the reaction zone is passed to a settling zone to separate an acid stream containing HF and acid soluble oil, the improvement of purifying said stream which comprises:

introducing said stream into an intermediate region of a vertically-extending separation zone;

introducing said isoparaffin as a liquid into the upper region of said separation zone as reflux;

removing soluble oil containing entrained HF from the bottom of said separation zone;

intimately contacting said acid soluble oil which is removed from the bottom of said separation zone with a vaporous stream of said isoparaffin in a mixing zone, and passing the resulting mixture into a lower region of said separation zone;

removing a stream containing purified HF from the top of said separation zone; and recovering acid soluble oil substantially free of entrained HF from said lower region of said separation zone below said entry point.

2. The method of claim 1, further comprising passing an additional vaporous isoparaffin stream into said lower region of said separation zone.

3. The method of claim 1 wherein said mixing zone comprises an aspirator in which said acid soluble oil which is removed from the bottom of said separation zone is drawn into said vaporous isoparaffin stream.

4. The method of claim 1 wherein the acid soluble oil containing entrained HF is removed from said separation zone from the bottom thereof.

References Cited
UNITED STATES PATENTS

| | | | |
|---|---|---|---|
| 3,223,749 | 12/1965 | Van Pool et al. | 260—683.48 |
| 2,400,386 | 5/1946 | Bolinger et al. | 260—683.48 |
| 3,551,515 | 12/1970 | Gentry | 260—683.48 |
| 3,365,514 | 1/1968 | Slover | 260—683.48 |

DELBERT E. GANTZ, Primary Examiner

G. J. CRASANAKIS, Assistant Examiner

UNITED STATES PATENT OFFICE

CERTIFICATE OF CORRECTION

Patent No. 3,793,394                                    Dated: February 19, 1974

Charles C. Chapman

It is certified that error appears in the above-identified patent and that said Letters Patent are hereby corrected as shown below:

Column 4, line 36, delete "a" and insert therefor --- an entry point in the ---.

Signed and sealed this 9th day of July 1974.

(SEAL)
Attest:

McCOY M. GIBSON, JR.
Attesting Officer

C. MARSHALL DANN
Commissioner of Patents

Disclaimer

3,783,394.—*Leslie Ronald Avery*, Byfleet, England. FREQUENCY COMPARATOR SYSTEM. Patent dated Jan. 1, 1974. Disclaimer filed July 17, 1974, by the assignee, *RCA Corporation*.

Hereby enters this disclaimer to claims 1–5 of said patent.

[*Official Gazette July 8, 1975.*]